United States Patent [19]

Fallos

[11] Patent Number: 4,553,652
[45] Date of Patent: Nov. 19, 1985

[54] COUPLING MECHANISM

[75] Inventor: George Fallos, Easton, Pa.

[73] Assignee: Bell & Howell Company, Phillipsburg, N.J.

[21] Appl. No.: 525,386

[22] Filed: Aug. 22, 1983

Related U.S. Application Data

[63] Continuation-in-part of Ser. No. 249,562, Mar. 31, 1981, abandoned.

[51] Int. Cl.⁴ .................. F16D 7/04; F16D 67/02; F16H 55/30
[52] U.S. Cl. .................. 192/18 R; 192/48.5; 192/67 P; 464/38; 474/900
[58] Field of Search .......... 192/18 R, 18 A, 18 B, 192/48.5, 67 P; 464/38; 474/900, 902

[56] References Cited

U.S. PATENT DOCUMENTS

| | | |
|---|---|---|
| 1,407,115 | 2/1922 | Bailey . |
| 1,463,490 | 7/1923 | Slider . |
| 1,618,470 | 2/1927 | Patterson .................. 192/67 R |
| 2,204,421 | 6/1940 | Loshbough .................. 192/25 |
| 2,325,455 | 7/1943 | Williams .................. 53/57 |
| 2,384,418 | 9/1945 | Edmondson .................. 192/67 R |
| 2,443,213 | 6/1948 | Weber .................. 464/38 |
| 2,971,620 | 2/1961 | Rice, Jr. .................. 192/18 R |
| 3,369,418 | 2/1968 | Young .................. 474/900 |
| 3,490,303 | 1/1970 | Rosenberg .................. 474/900 |
| 3,546,897 | 12/1970 | Kenny .................. 464/38 |
| 3,602,345 | 8/1971 | Rattenberg, et al. .................. 192/18 A |
| 3,701,404 | 10/1972 | Cassell .................. 192/67 D |
| 3,948,369 | 4/1976 | Dodd .................. 192/67 R |

Primary Examiner—Rodney H. Bonck
Assistant Examiner—Alan G. Towner
Attorney, Agent, or Firm—Griffin, Branigan, & Butler

[57] ABSTRACT

A coupling mechanism comprises driving means 12 selectively engaged by driven means 13. The driving means 12 includes an active driving sprocket 15 engaged by a drive chain. The positional relationship of the sprocket 15 with respect to the drive chain is selectively adjustable through a clamp mechanism 21. Locking means 139, 141 preclude the driven means 13 from rotating when the driving means 13 is disengaged from the driving means 12. The positional relationship of the locking means 139 is adjustable relative to coupling drive pins 129.

15 Claims, 8 Drawing Figures

COUPLING MECHANISM

BACKGROUND

This is a continuation-in-part application of U.S. patent application Ser. No. 249,562, filed Mar. 31, 1981, now abandoned.

This invention pertains to coupling mechanisms, and particularly to clutch-type coupling mechanisms for imparting motion from driving machinery to driven machinery.

Known pin clutch mechanisms basically include a driven member and a driving member selectively engagable therewith along an axial direction. The driving member, such as a gear or sprocket, may be engaged by a drive chain or the like extending there around. A forked yoke or similar structure may be employed to selectively displace one of the members toward or away from the other. Engagement occurs when one or more axially extending pins on either of the members engages corresponding apertures in the other member.

In coupling mechanisms, such as the pin clutch mechanism basically described above, quite often the tension on the drive chain must be adjusted to compensate for any slip or movement suffered by the driving member. Such slips are often caused by an overload or excessive torque which may occur when the driven member is engaged to the driving member.

In the operation of some coupling mechanisms it is required that a driven member disengage and reengage a driving member in timed relationship. This is particularly difficult to do when upon disengagement the driven member is free to rotate.

Accordingly, and object of this invention is to provide a quick and convenient means for adjusting the positional relationship of a coupling mechanism driving means with respect to a drive chain.

An advantage of the invention is the provision of means for protecting a coupling mechanism when an overload occurs due to excessive torque.

Another advantage of this invention is the provision of means for permitting the driven member to disengage and re-engage the driving member in timed relationship.

SUMMARY

A coupling mechanism has driving means selectively engagable by driven means. A clamp mechanism facilitates the angular adjustment of an active driven sprocket with respect to a drive chain which semi-circumferentially engages the sprocket. Plunger-like connectors connect a passive portion of the driving means to the active driving sprocket so long as the torque of the driving means is not excessive. Should disconnection occur due to excessive torque, the passive portion of the driving means is reconnectable in timed relationship to the sprocket.

Disengagement and re-engagement of the driven means with respect to the driving means also occurs in timed relationship. In this regard, when the driven means is disengaged from the driving means, the driven means is prevented from further rotation. Apertures in the driven means are engaged by stationary lugs secured to the machine structure. The positional relationship of these apertures with respect to coupling drive pins on the driven means is selectively adjustable.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

Figure 1:
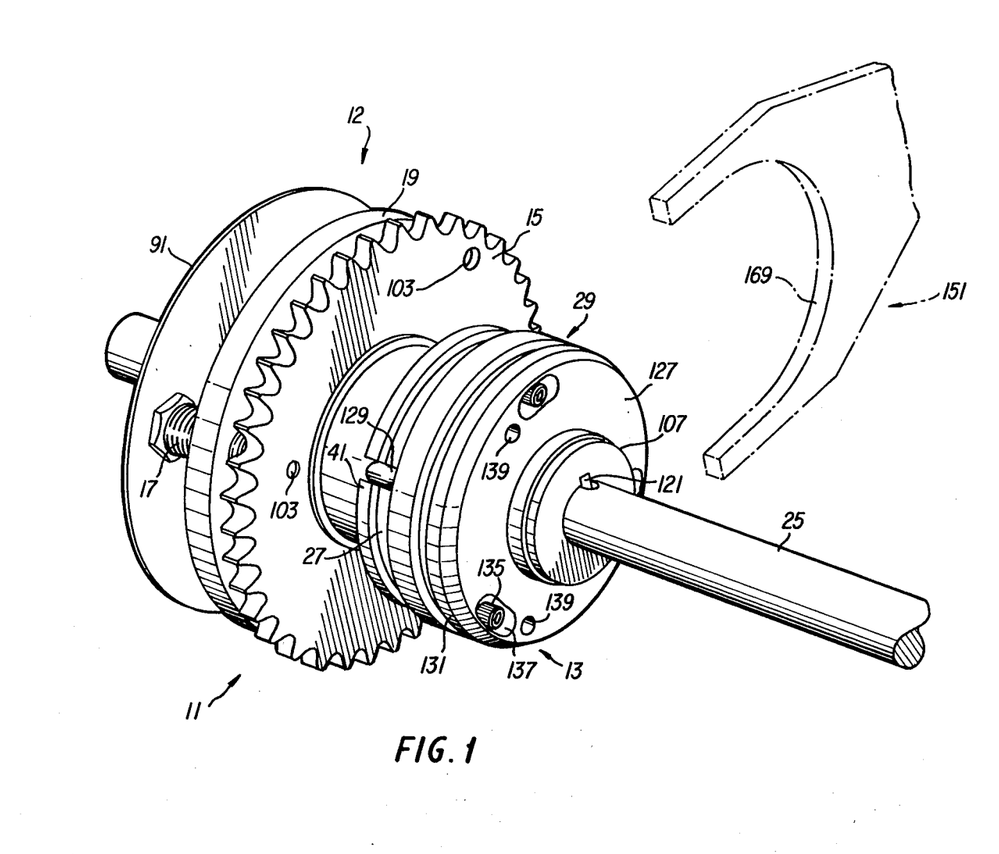
FIG. 1 is a perspective view of a coupling mechanism and a yoke structure according to an embodiment of the invention.
Figure 2:
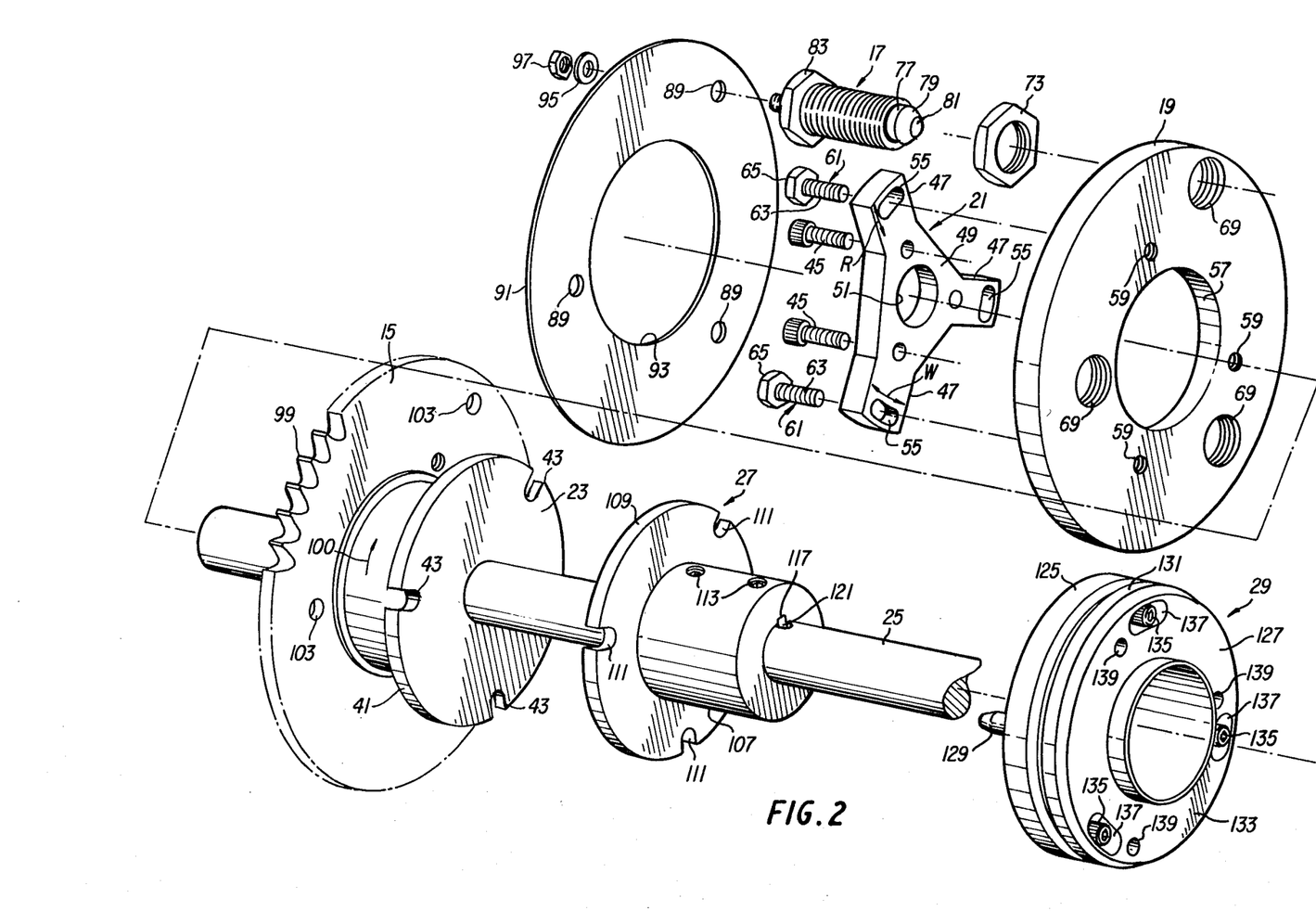
FIG. 2 is an exploded view of the coupling mechanism of FIG. 1.
Figure 3:
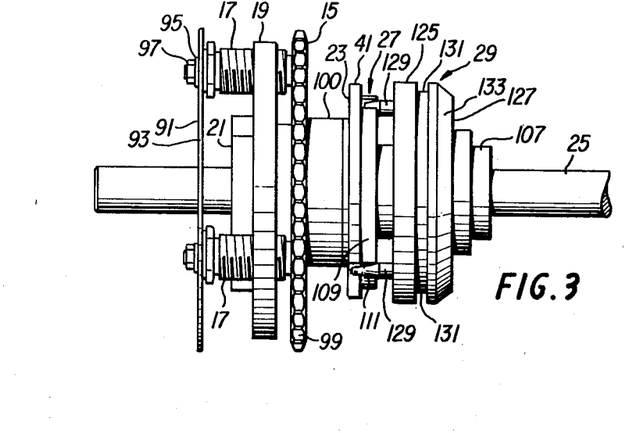
FIG. 3 is a side view of the coupling mechanism of FIG. 1.

FIGS. 1 and 2 illustrate a coupling device 11 comprising a driving means generally indicated as 12 and a driven means generally indicated as 13. Driving means 12 comprises an active driving means, such as sprocket 15, and passive driving means connectable thereto. The passive driving means comprise a plurality of plunger-like connectors 17; a carrier plate 19; a spider clamp 21; and, a hub 23. The passive driving means are termed "passive" since motion is imparted thereby only when the passive driving means is connected to the active driving means 15.

Driven means 13 comprises a rotatable driven shaft 25; a pin drive flange 27; and, a pin drive ring assembly 29. As shown in either FIG. 7 or FIG. 8, a left end of the rotatable driven shaft 25 is rotatably mounted in a bearing 31 in a left support arm 33 while a right end of the shaft 25 is rotatably mounted in a bearing 35 in a right support arm 37. The support arms 33,37 are in turn mounted to a side rail 38 from which they orthogonally extend. In this respect, the side rail 38 may be a suitable surface of a document handling machine such as that illustrated in U.S. Pat. No. 2,325,455 to Williams which is incorporated herein by reference.

The hub 23 of driving means 12 is essentially circular and concentric with the driven shaft 25. The hub 23 comprises a sleeve portion 39 which is rotatably mounted over the shaft 25. A hub rim portion 41 extends radially away from the hub sleeve 39 so that the hub rim 41 has its periphery at a radius greater than the radius of the sleeve 39.

Spaced around the hub rim 41 are a plurality of slotted apertures 43 which extend through the rim 41. FIG. 2 illustrates an embodiment wherein three such apertures 43 are spaced about the rim 41 with an angular separation between each aperture 43 of 120°. The slotted apertures 43 have circular portions about an axis parallel to shaft 25. The slotted apertures extend to the periphery of rim 41. The axes of the apertures 43 illustrated in FIG. 2 are all at the same radial distance from the axis of shaft 25. If desired, the axis of each hub aperture 43 could be positioned at a unique radius from the shaft 25 if a different timing relationship were required for the particular operating environment.

Figure 4:
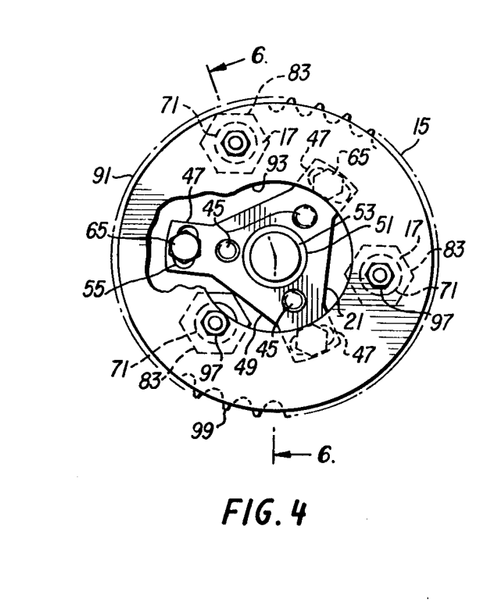
FIG. 4 is a partially cut-away left end view of FIG. 3.

The spider clamp 21 is secured to the left end of the hub sleeve 39 by a plurality of fasteners 45. The spider clamp 21 shown in FIGS. 2 and 4 has three arms 47 radially extending from an essentially triangular center portion 49. Clamp center portion 49 has a common axis with the shaft 25. An aperture 51 extends through the center triangular portion 49 to accommodate a rotatable sleeve or bearing 53 which, in turn, fits over the driven shaft 25. Thus, the spider clamp 21 is rotatable about the driven shaft 25.

Clamp arms 47 each have an elongated aperture or slot 55. Each slot 55 has a greater dimension with respect to an angular width (denoted by the distance W in FIG. 2) than a radial dimension (indicated by a R).

The carrier plate 19 comprises a circular disc which is concentric with the rotatable driven shaft 25. Carrier plate 19 has a central aperture 57 therein for accommodating the left end of hub sleeve 39 over which the carrier plate 19 fits. Carrier plate 19 has a plurality of threaded apertures 59 (three such apertures 59 being shown in FIG. 2) which are angularly spaced therearound and which extend through the carrier plate 19 for receiving threaded fasteners 61.

Each threaded fastener 61 has a threaded shaft portion 63 which extends through a corresponding elongated slot 55 of the spider clamp 21. Further, each fastener 61 has a hexagonal or the like head 65 which is too large to pass through the elongated slot 55 and which bears against a left face of the spider clamp 21.

The carrier plate 19 also has a plurality of additional threaded apertures, three such apertures being shown in FIG. 2 and labeled 69. As illustrated, the three apertures 69 are at an angular separation of 120° about the axis of the carrier plate 19. Each aperture is internally threaded to receive a corresponding connector 17 in the manner hereinafter described. Moreover, each aperture 69 is at a unique radial distance from the axial center of the carrier plate 19.

Figure 6:
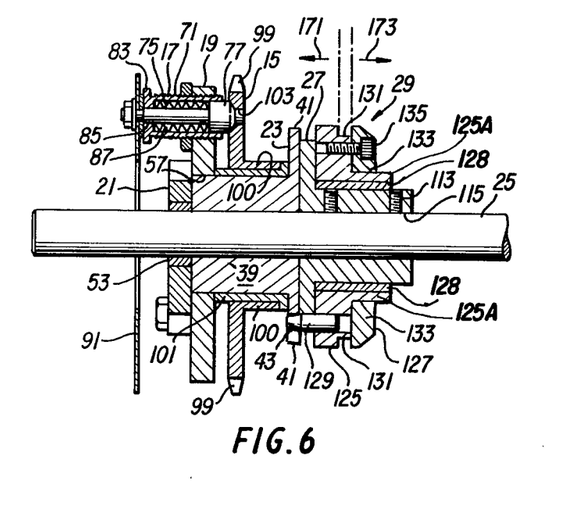
FIG. 6 is a sectional side view of FIG. 4 taken along the line 6—6.

As seen in FIG. 6, each plunger-like connector 17 comprises a housing 71. The exterior of the housing 71 is threaded so that it may be engaged both by the aperture 69 in carrier plate 19 and a lock nut 73. The interior of the housing 71 is hollow to accommodate a plunger stem 75. Plunger stem 75 is adapted to reciprocate in a direction parallel to the axis of the shaft 25.

A right end of the stem 75 has a plunger head 77 of greater radius which freely extends through a right end of the housing 71. A right end of the head 77 is slightly tapered at 79.

A left end 83 of the housing 71 has an aperture 85 therein just large enough to permit a left end of the plunger stem 75 to extend therethrough. Biasing means, such as Belleville washers 87, are contained in the housing 71 for urging the plunger head 77 toward the right (as seen in FIG. 6).

The left end of the plunger stem 75 is threaded and, in addition to protruding through the housing left end 83, protrudes through correspondingly aligned apertures 89 in a metallic switch trip plate 91. Switch trip plate is essentially a circular disc concentric with the axis of driven shaft 25 and has a central aperture 93 therein sufficiently large enough for the shaft 25 to extend therethrough. Although not shown in the drawings, the switch trip plate 91 is connectable to a microswitch such that when deflected leftward the switch trip plate 91 contacts the microswitch or a terminal connected therewith. Upon emerging from the left face of the switch trip plate 91, each threaded stem 75 of connector 17 receives a washer 95 and an internally threaded lock nut 97.

Sprocket 15 is essentially circular in shape and is coaxial with the rotatable driven shaft 25. The periphery of sprocket 15 has teeth 99 thereon which engage a drive chain (not illustrated). In this respect, the drive chain extends semi-circumferentially around the periphery of sprocket 15. The sprocket 15 further comprises an axial flange 100 which is concentrically and rotatably mounted over a sleeve 101, which is in turn concentrically and rotatably mounted over the hub sleeve 39.

A plurality of circular apertures 103 extend through the sprocket 15. In the embodiment illustrated, three such apertures 103 are angularly separated at 120° about the central axis of the sprocket 15. In like manner as with the aperture 69 in carrier plate 19, each aperture 103 in sprocket 15 is spaced from the center of the sprocket at a unique radial distance. In fact, the apertures 103 are adapted to receive corresponding plunger heads 79 of connectors 17. In this respect, a left side of each sprocket aperture 103 is machined to a frustroconical taper to accommodate tapered portions 79 of each plunger head 77.

As seen in FIG. 6, the sprocket 15 has its axial flange 100 biased to the right against the rim 41 of hub 23. In this regard, the Belleville washers 87 in each connector 87 urge the plunger heads 77 rightwardly to sprocket 15.

In addition to the rotatable driven shaft 25, driven means 13 also comprises the pin drive flange 27 which is essentially concentric with the shaft 25. The pin drive shaft 27 comprises an essentially axially extending sleeve portion 107 and a rim portion 109 having a greater radius than the sleeve portion 107. In this respect, the rim 109 of flange 27 has a plurality of slots 111 spaced about its periphery. In the embodiment shown in FIG. 1, three such slots 111 are angularly spaced around the periphery of rim 109 at a 120° separation.

The flange sleeve 107 is secured on the rotatable driven shaft 25 by two fasteners 113. An internal circular aperture 115 extends through the sleeve 107 along the axial direction of the shaft 25. A square notch 117 extends longitudinally along the internal circular aperture 115. An essentially rectangular key 121 formed on the shaft 25 is insertable into the square notch 117 and precludes rotational motion of the pin drive flange 27 about the shaft 25.

The driven means 13 further comprises an essentially circular drive pin ring assembly 29. The drive pin ring assembly 29 comprises both a drive pin carrier 125 and a pin lock flange 127. The pin lock flange 127 fits over a hub extension 125a of the drive pin carrier 125. Drive pin carrier 125 has an axial annular opening extending therethrough to accommodate a hollow cylindrical sleeve or bearing 128 which is press fit therein. Sleeve 128 is formed from a low coefficient of friction material such as, for example, teflon, ultra-high molecular weight polyethylene, or acetal. Sleeve 128 in turn fits over the hub extension of the pin drive flange 27. The drive pin carrier 125 has a plurality of drive pins 129 angularly spaced thereabout and leftwardly extending from a left face of the carrier 125. Depending on the particular timed relationship sought between the driving means 12 and driven means 13, any number of such drive pins 129 may be utilized. Three such pins 129 are illustrated in the illustrated embodiments. The drive pins 129 are spaced at a radial distance from the center of the carrier 125 so that the drive pins 129 may be selectively aligned with both rim slots 111 in pin drive flange 27 and corresponding hub apertures 43 in the driving means 12.

A right face of the drive pin carrier 125 has a circumferential channel therearound of lesser radius than either the left face of the drive pin carrier 125 or a left face of the pin lock flange 127. Thus, the channel 131 is an annular groove extending completely around the periphery of the drive pin ring assembly 29.

Figure 5:
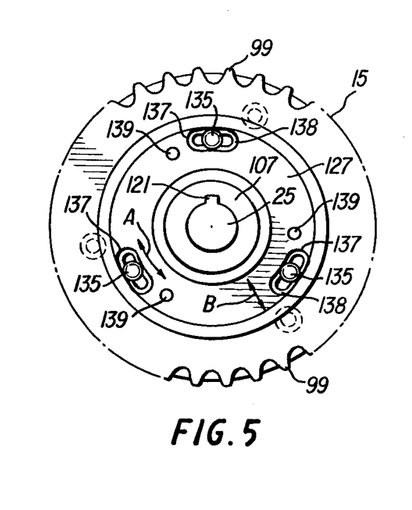
FIG. 5 is a right end view of FIG. 3.

The pin lock flange 127 is also essentially circular and concentric with the driven shaft 25. The pin lock flange 127 comprises a rim portion 133 which is secured to the right face of the drive pin carrier 125 by a plurality of fasteners 135. In this respect, rim portion 133 has a plurality of angularly elongated slots 137 through which the fasteners 135 extend into the drive pin carrier 125. As seen in FIG. 5, at the right face of the pin lock flange 127 the slots 137 have an angular dimension (denoted by A) which is greater than a radial dimension (denoted by B). Between the right face and left face pin lock flange 127 the angular dimension and radial dimension of each slot 137 decreases to form a collar 138 against which a head of fastener 135 bears. Thus, the angular relationship of pin lock flange 127 with respect to the drive pin carrier 125 can be selectively adjusted by loosening the fasteners 135, rotating the pin lock flange 127 in the desired direction and to the desired angular displacement, and then tightening the fasteners 135 on the corresponding collar 138.

Rim portion 133 of the pin lock flange 127 also has on a right face thereof a plurality of apertures 139 which are adapted to receive corresponding lock assembly projections or lug 141. Projections 141 are rigidly secured to the right support arm 37 (see FIG. 7).

Figure 7:
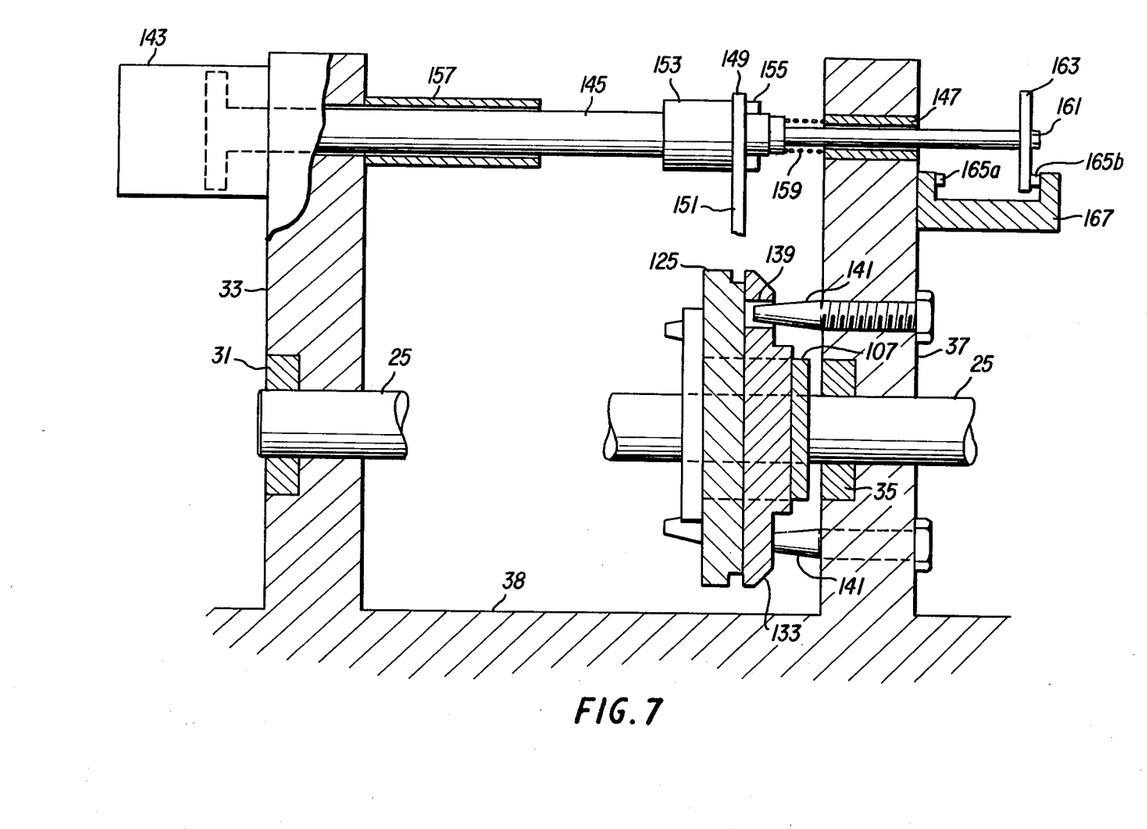
FIG. 7 is a partially-sectioned side view of an embodiment of actuating mechanisms showing a coupling mechanism in a disengaged position; and, FIG. 8 is a partially-sectioned side view of another embodiment of actuating mechanisms showing a coupling mechanism in an engaged position.

With reference to the embodiment of actuating mechanisms shown in FIG. 7, a clutch vacuum motor 143 is mounted proximate a top end of the left support arm 33. A piston rod 145 operative with the motor 143 extends from the motor 143 in a longitudinal direction toward the right support arm 37. In this respect, the piston rod 145 is supported by a sleeve bearing 147 in the right support arm 37. An upper end 149 of a yoke shifter 151 is secured to the piston rod 145 by a coupling 153 and a lock nut 155. An actuator stroke stop 157 encircles the piston rod 145 and limits the leftward movement of the piston rod 145 at a desired point by contacting the piston rod coupling 153. A spring 159 urges the piston rod 145 and yoke shifter 151 secured thereto leftward when the motor 143 is not activated.

The piston rod 145 emerges on the right side of the right support arm 37 and has affixed by a fastener 161 to its extreme right end a disc trip 163 positioned perpendicularly to the piston rod 145. The disc trip 163 is adapted to reciprocate with the piston rod 145 and contact at the extremes of its reciprocating motion microswitch 165a or microswitch 165b. In this regard, the microswitches 165 are mounted on opposite ends of a bracket 167 which, in turn, is secured to the right support arm 37 by suitable fastening means (not illustrated). As seen in the disengaged position depicted in FIG. 7, the disc trip 163 is contacting the "disengage" microswitch 165b.

As seen in FIG. 1, a lower portion of the yoke shifter 151 contains an essentially U-shaped slot 169 which is fabricated to fit into the circumferential channel 131 of the drive pin ring assembly 29. In this respect, the yoke shifter 151 mounted on the reciprocating piston rod 145 is adapted to selectively displace the drive pin ring assembly 29 either leftward (illustrated by the arrow 171 in FIG. 6) or rightward (illustrated by the arrow 173 in FIG. 6).

Figure 8:
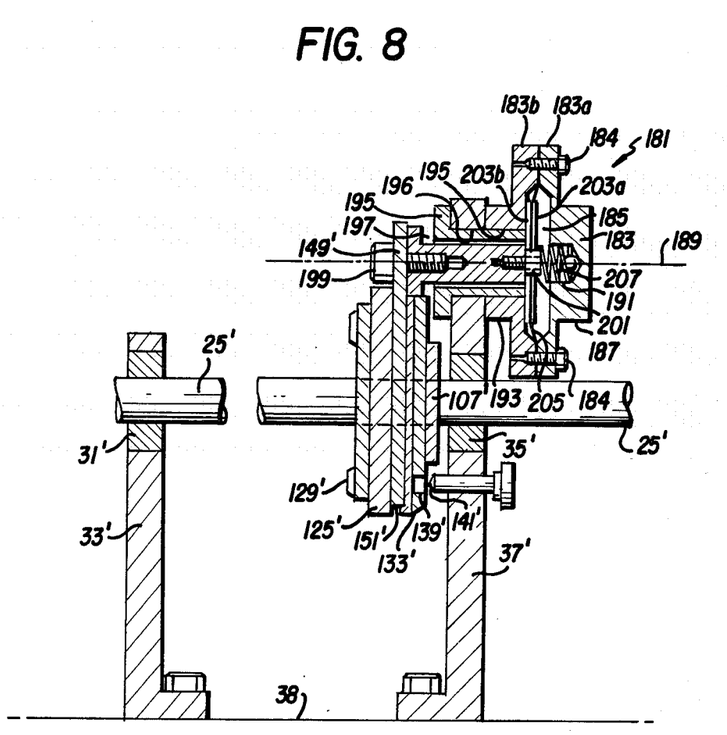

With reference to another embodiment of actuating mechanisms as shown in FIG. 8, a diaphragm actuator 181 is mounted proximate a top end of a right support arm 37'. (In discussing the FIG. 8 embodiment, primed referenced numerals basically correspond to unprimed reference numerals referring to analogous FIG. 7 elements. Subsequent discussions regarding the operation of the coupling mechanism which refer only to unprimed reference numerals should be understood to apply in appropriate instances to primed reference numerals as well.) The diaphragm actuator 181 includes an actuator cap 183 which comprises cap mating halves 183a and 183b held together by fasteners 184. The two halves 183a and 183b mate in such a way to form an essentially disc-shaped cavity 185 therebetween. Cavity 185 communicates through suitable hoses or the like (not illustrated) to a vacuum source (also not shown).

Actuator cap half 183a has a hub portion 187 which extends rightwardly (as seen in FIG. 8) from the cap 181 along cap axis 189. The interior of cap half 183a has a central cavity 191 extending from the cavity 185 into the hub portion 187.

Actuator cap half 183b likewise has a hub portion 193 which extends leftwardly (as seen in FIG. 8) from the cap 181 along cap axis 189. Cap hub 193 has an axial annular opening extending therethrough to accommodate a right end portion of an essentially cylindrical, hollow mounting sleeve 195. The mounting sleeve 195 has an outer diameter which permits it to be snugly mounted in an aperture 196 in the right support arm 37'. The left end of mounting sleeve 195 has a rim portion of larger diameter than that of the remainder of the sleeve 195 generally.

An actuator rod 197 axially extends through the interior of the mounting sleeve 195. A left end of actuator rod 197 has a rim portion of larger diameter than that of the remainder of the rod 197 generally. An upper yoke end 149' of a yoke shifter 151' is secured to the left end of the actuator rod 197 by an axially extending fastener 199 which is threaded to engage a counter-threaded bore in the actuator rod 197.

A right end of the actuator rod 197 has an axial bore counter-threaded to receive an axially extending fastener 201 which secures a diaphragm support disc 203 to the actuator rod 197. The diaphragm support disc 203 actually comprises a right disc portion 203a and a left disc portion 203b which, when fastener 201 is tightened against the actuator rod 197, clamp a diaphragm 205 therebetween. The diaphragm 205 spans the circular cross-section of cavity 185 and has its edges clamped between the mating halves 183a and 183b of actuator cap 183.

The diaphragm support disc 203 is of a diameter greater than the outer diameter of the mounting sleeve 195, and hence is of a diameter greater than the actuator rod 197. Thus, the disc 203 is retained in the cavity 185 since the interior surface hub half 183b forms a stop for the disc 203 which has the reciprocating actuator rod 197 secured thereto. The diaphragm support disc 203 as well as the diaphragm 205 engaged therewith are generally biased leftward against the interior surface of hub half 183b by a spring 207 which is retained in cavity 191 against the interior surface of hub half 183a.

In operation, engagement of the coupling mechanism occurs when yoke shifter 151 with its U-shaped slot 169 fitting into circumferential channel 131 moves the drive pin ring assembly 29 leftward so that drive pins 129 thereon extend into the hub apertures 43 in the hub rim 41 of the driving means 12. In this respect, movement of the yoke shifter 151 may be accomplished using the actuator mechanisms of either FIGS. 7 or 8.

In the above regard, and with respect first to the actuator mechanisms of FIG. 7, when the clutch vacuum motor 143 is not energized, the piston rod 145 is positioned so that the coupling 153 thereon abuts the actuator stroke stop 157. When the actuator rod 145 is in this position, the yoke shifter 151 has moved the drive pin ring assembly 29 leftward for engagement with driving means 12 as described above. While the piston rod 145 is in this position, the disc trip 163 contacts the left microswitch 165a mounted on bracket 167, thereby providing an indication that the coupling mechanism is engaged.

With respect to the actuator mechanisms of FIG. 8, when a vacuum is not applied to the cavity 185 in the actuator cap 183, the spring 207 biases the diaphragm support disc 203 together with the actuator rod 197 leftward so that the disc 203 abuts the interior surface of the cap half 183b. When the actuator rod 197 is in this position, the yoke shifter 151 has moved the drive pin ring assembly 29 leftward for engagement with driving means 12 as described above.

When the drive pins 129 of the drive pin ring assembly 29 are engaged to the driving means 12 using the actuating mechanisms of either FIGS. 7 or 8, the rotational motion of the active sprocket 15 is transmitted to the driven means 13. In particular, the drive chain (not illustrated) engaging the sprocket teeth 99 cause the sprocket 15 to rotate. Since under normal conditions the plunger heads 79 of connectors 17 extend into the socket apertures 103, and since the connectors 17 are secured into the carrier plate 19, the carrier plate 19 generally rotates with the sprocket 15. Since the spider clamp 21 is secured to the carrier plate 19, spider clamp 21 also rotates with the carrier plate 19 and sprocket 15. Likewise, since the spider clamp 21 is secured to the hub 23, the hub 23 in which the drive pins 129 are engaged rotates with the sprocket 15.

Should the torque on the driving means 12 become too great while the driven means 13 engages the driving means 12, the excessive torque causes each plunger-like connector 17 to be disengaged from its corresponding aperture 103 in the sprocket 15. In this respect, the excessive torque causes the tapered plunger head 77 to slide out of its corresponding aperture 103 in the sprocket 15. The amount of torque deemed excessive is determined by various structural factors, including the tension of the Belleville washers 87 in the connectors 17. When the plunder head 77 becomes disengaged from the sprocket 15 in this manner, the carrier plate 19 (and hence the spider clamp 21 and the hub 23) cease to rotate. Likewise, disengagement of the plunger head 77 from the sprocket 15 in the above-described manner causes the driven means 13 engaging the hub 23 of driving means 12 to cease rotating.

When the plunger head 77 is disengaged from the sprocket 15, resulting movement of the plunger stem 75 toward the left (as seen in FIG. 6) causes the switch trip plate 91 to which the plunger stem 75 is secured to deflect and contact a microswitch (not illustrated) which generates a signal indicative of an overload condition.

Once the overload has been remedied, the connectors 17 may again engage corresponding apertures 103 in the sprocket 15. However, since a timed relationship should exist between the rotational motion of the sprocket 15 and the driven means 13, reengagement of the connector 17 with the sprocket 15 must not disrupt the timed relationship of the sprocket 15 and the driven means 13. Thus, each connector 17 is adapted to mate with a unique aperture 103 in the sprocket 15. In this respect, the connectors 17 are essentially identical but are each positioned at a unique radius on the carrier plate 19. An aperture 103 in the sprocket 15 is correspondingly positioned at a radius comparable to that of its mating connector 17. Since each connector 17 and its mating aperture 103 on sprocket 15 is at a unique radius, the connectors 17 can engage the sprocket 15 only when the angular position of the sprocket 15 corresponds to the position of the carrier plate 19.

On occasion it may be necessary to adjust the angular position of the sprocket 15 with respect to the engaging drive chain (not illustrated). That is, the sprocket 15 may need to be slightly rotated so that sprocket teeth 99 properly engage the drive chain. In such event, the fasteners 61 extending through the left face of the spider clamp 21 may be loosened so that the carrier plate 19 may be slightly rotated. In this respect, rotation of the carrier plate 19 also causes rotation of the sprocket 15 since the rotational displacement of carrier plate 19 is transmitted to the sprocket 15 through the connectors 17. While the carrier plate 19 (and thus sprocket 15) are being slightly rotated, the spider clamp 21 remains stationary. When the carrier plate 19 is thus properly adjusted, each fastener 61 is reinserted into its corresponding elongated slot 55 in the spider 21. The threaded portion 63 of the fastener 61 extends into the threaded aperture 59 of the carrier plate 19. In this manner, the elongated slots 55 of spider 21 allow the carrier plate 19 and fasteners 61 anchored therein to be slightly rotated while the spider clamp 21 remains stationary.

When the driven means 13 is to be disengaged from the driving means 12, the clutch vacuum motor 43 causes the piston rod 145 to be displaced toward the right (as seen in FIG. 7). Likewise, yoke shifter 151 secured to the piston rod 145 is displaced toward the right, and the yoke shifter 151 causes the drive pin ring assembly 29 to also be displaced toward the right. Rightward displacement of the drive pin ring assembly 29 withdraws the drive pins 129 from the hub apertures 43 of the driving means 12 and thus disconnects the driven means 13 from the driving means 12.

As the driven means 13 is disengaged toward the right by the yoke shifter 151, lock assembly projections 141 mounted on the right support arm 37 engage corresponding apertures 139 on the pin lock flange 127. Thus, the driven means 13 is restrained from further rotational motion upon disengagement from the driving means 12 by engagement of the lock assembly projections 141 into the apertures 139.

In some instances it may be necessary to adjust the relative positions of the apertures 139 on the pin lock flange 127 with respect to the drive pins 129 on the drive pin ring assembly 29. In this event, pin lock flange 127 can be rotated with respect to the drive pin carrier 125 when fasteners 135 are relaxed so that they do not bear against slot collars 138 of the pin lock flange 127. The elongated slot 137 in the pin lock flange 127 allows the flange 127 to be rotated with respect to the drive pin carrier 125. After the pin lock flange 127 has been rotated to the desired degree, the fasteners 135 are then retightened to bear against the collars 138 of flange 127.

With respect to the embodiment of FIG. 7, energization of the clutch vacuum motor 143 causes the piston rod 145 to travel righward, with the result that yoke shifter 151 causes the drive pin ring assembly 29 to be disengaged from the driving means 12. Upon rightward actuation of the piston rod 145, the disc trip 163 at the right extreme of the piston rod 145 contacts the microswitch 165b on bracket 167 to indicate a disengaged position.

With respect to the embodiment of FIG. 8, application of a vacuum to the cavity 185 in actuator cap 183 exerts a negative pressure on the diaphragm 205 and the diaphragm support disc 203 to overcome the bias of the spring 207, with the result that the support disc 203, the actuator rod 197, and the yoke shifter 151' move rightward. Rightward movement of the yoke shifter 151' causes the drive pin ring assembly 29 to be disengaged from the driving means 12. Although not shown in FIG. 8, it should be understood that indicator means, such as a microswitch, may be incorporated into the FIG. 8 structure to indicate disengagement.

While the invention has been particularly shown and described with reference to the preferred embodiments thereof, it will be understood by those skilled in the art that various alterations in form and detail may be made therein without departing from the spirit and scope of the invention. For example, instead of employing a vacuum motor 143 to operate the piston rod 145, an electrical motor with a solenoid may be utilized. Moreover, as mentioned above, the number of drive pins 129 utilized depends upon the particular timing relationship sought between the driving means 12 and the driving means 13.

The embodiments of the invention in which an exclusive property or privilege is claimed are defined as follows:

1. A coupling device for selectively connecting driving machinery to driven machinery and for selectively imparting motion to said driven machinery, said coupling device comprising:
   support means;
   driven means mounted in said support means;
   driving means, for imparting motion to said driven means when said driven means engages said driving means, said driving means having a first portion thereof engaged by a drive chain and a second portion thereof selectively engageable with said driven means, said driving means second portion being connectable to said driving means first portion, said driving means second portion comprises:
   connector means adapted to selectively connect said driving means second portion to said driving means first portion so long as the torque of said driving means does not exceed a predetermined limit;
   carriage means whereon said connector means is mounted;
   hub means adapted to be engaged by said driven means; and,
   clamping means, said clamping means being secured to said hub means and to said carriage means, said clamping means having means for adjusting the angular relationship of said carriage means with respect to said hub means, and thereby means to permit the adjustment of the positional relationship of said driving means first portion connectable to said driving means second portion with respect to said drive chain engaging said driving means first portion.

2. The coupling device of claim 1 wherein said driving means second portion further comprises fastener means, said fastener means having a first end adapted to be threadably received in said carriage means, said fastener having a head at a second end thereof; and wherein said clamping means has at least one elongated aperture therein, said elongated aperture adapted to permit said fastener means extending therethrough to secure said clamping means to said carriage means and to permit the adjustment of the angular relationship of said carriage means with respect to said hub means.

3. The coupling device of claim 1 wherein said driving means first portion is a sprocket having teeth on its periphery for engaging said drive chain.

4. The coupling device of claim 1, wherein said driving means first portion has at least one aperture therein, and wherein said connector means is engaged by said driving means second portion and biased to extend into said aperture of said driving means first portion so long as the torque of said driving means does not exceed a predetermined limit.

5. The coupling device of claim 4, wherein said driving means first portion has a plurality of apertures therein, wherein said driving means second portion comprises a plurality of said connectors, and wherein said apertures are positioned on said driving means first portion and said connectors are positioned on said driving means second portion so that, after disconnection of said driving means second portion from said driving means first portion, said driving means second portion can only be reconnected in timed relation to said driving means first portion.

6. The coupling device of claim 5, wherein said driving means first portion and said driving means second portion are concentric to a common axis, wherein said driving means first portion and said driving means second portion are rotatable about said common axis, and wherein each of said connectors is adapted to extend into a corresponding aperture in said driving means first portion.

7. The coupling device of claim 6, wherein each of said apertures in said driving means first portion is positioned at a unique radius from said axis.

8. The coupling device of claim 4, wherein said connector means comprises plunger means, and wherein said plunger means further comprises:
   housing means secured to said driving means second portion;
   a plunger stem adapted to reciprocate in said housing means;
   a head on a first end of said plunger stem adapted to extend into said aperture of said driving means first portion; and,
   means to bias said plunger head toward said driving means first portion.

9. The coupling device of claim 8, wherein a second end of said plunger stem is adapted to activate a signal when said driving means second portion becomes disconnected from said driving means first portion.

10. The coupling device of claim 1, wherein said machinery is a document insertion machine.

11. The coupling device of claim 1, further comprising:
  locking means for preventing the rotational motion of said driven means when said driven means is disengaged from said driving means.

12. The coupling device of claim 1, further comprising fluidically-actuated transmission means for moving said driven means into selective engagement with said driving means.

13. The coupling device of claim 12, wherein said fluidically-actuated transmission means comprises:
  diaphragm means provided in a cavity of a housing;
  follower means connected to said diaphragm means and capable of reciprocating movement in response to movement of said diaphragm means;
  means for utilizing the reciprocating movement of said follower means to selectively move said driven means into engaged relationship with said driving means;
  means for biasing said diaphragm means in a first position so that said follower means and said utilization means connected thereto cause said driven means to be positioned in engagement with said driving means; and,
  a source of vacuum seletively communicable to act on said diaphragm in a manner to overcome said biasing means for moving said diaphragm in a second position, said movement of said diaphragm to said second position causing said driven means to be moved out of engagement with said driving means.

14. A coupling device for selectively connecting driving machinery to driven machinery and for selectively imparting motion to said driven machinery, said coupling device comprising:
  support means;
  driven means mounted in said support means;
  driving means;
  means for selectively engaging said driven means with said driving means so that said motion is imparted to said driven means when said driven means engages said driving means; and,
  locking means for preventing rotational motion of said driven means when said driven means is disengaged from said driving means, said locking means comprising at least one member on said support means and at least a corresponding mating member on said driven means, said member on said support means and said corresponding member on said driven means being adapted to matingly engage when said driven means is translated toward said support means and away from said driving means; and,
  wherein said driven means has said engaging means thereon for selectively engaging said driving means, and wherein the angular position of said corresponding mating member on said driven means is selectively adjustable with respect to the angular position of said engaging means.

15. The coupling device of claim 14 wherein said driven means further comprises:
  carrier means on which said engaging means is mounted;
  flange means mounted on said carrier means, said flange means including said correspondong mating member adapted to mate with said member on said support means, said flange also having at least one elongated slot extending therethrough; and,
  fastening means for selectively securing said flange means to said carrier means on which said engaging means is mounted, said fastening means extending through said elongated slot and into said carrier means on which said engaging means is mounted so that said flange means may be angularly adjusted with respect to said carrier means on which said engaging means is mounted.

* * * * *